Jan. 6, 1970 W. D. CARTER 3,488,339
PROCESS FOR REMOVING CATALYST CONTAMINANTS FROM
POLYMERIZABLE α-OLEFINS
Original Filed June 27, 1963
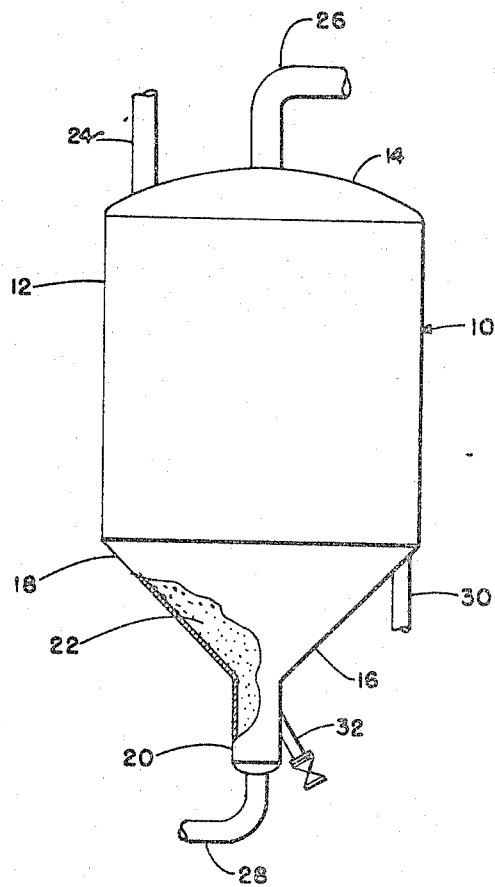
WILLIAM D. CARTER
INVENTOR.
BY
ATTORNEYS

United States Patent Office 3,488,339
Patented Jan. 6, 1970

3,488,339
PROCESS FOR REMOVING CATALYST CONTAMINANTS FROM POLYMERIZABLE α-OLEFINS
William Dale Carter, Kingsport, Tenn., assignor to Eastman Kodak Company, Rochester, N.Y., a corporation of New Jersey
Continuation of application Ser. No. 291,068, June 27, 1963. This application July 18, 1967, Ser. No. 654,274
Int. Cl. C08f 1/96, 1/06
U.S. Cl. 260—93.7                 8 Claims

ABSTRACT OF THE DISCLOSURE

Process for removing catalyst contaminants in an α-olefin feed stock which comprises contacting the feed stock prior to polymerization with polymerized α-olefin containing active catalyst residue.

---

This application is a continuation of copending application Ser. No. 291,068 filed June 27, 1963 and now abandoned.

This invention relates to the separation of solid polypropylene from propylene gas. More particularly it relates to a process and apparatus for separating solid polymer particles formed in the polymerization of propylene from unreacted propylene monomer and contacting make up monomer with unreacted catalyst embedded in the polymer particles.

The production of polypropylene requires separation of solid polymer particles from unreacted monomer. Heretofore various methods of accomplishing such separation have been used, for example, cyclone separators from which dry powdery polypropylene is removed at the bottom by rotating valves and vapors remaining from heating of a slurry of a polypropylene-solvent mixture at the top. This and other comparable systems known to the prior art generally require rather complex moving parts, and no truly simple and economical method of collecting the polymer in solid particle form is as yet known. Therefore the development of a simple and economical system for separating propylene polymer particles from unreacted propylene monomer in a single step represents a highly desirable result. After extended investigation I have found such a process and apparatus whereby in a single zone polypropylene polymer particles may be both separated from unreacted monomer and classified according to size, unused catalyst being conveniently utilized in the same operation.

One object of this invention is to provide a process and apparatus for efficiently separating polypropylene powder from unreacted monomer. Another object is to provide means for classification of propylene polymer particles upon their separation from unreacted monomer. A further object is to utilize catalysts remaining after formation of polypropylene in the removal of contaminants from propylene monomers in a process and apparatus for separating the propylene polymer from unreacted monomer. Other objects will appear hereinafter.

In its broader aspects my invention involves settling freshly formed polypropylene solids in a substantially cylindrical container having a funnel-like lower portion while removing unreacted monomer in gaseous form from the upper portion of said container. The bed formed by settling of the particles of polymer is fluidized with make-up monomer introduced at the bottom of the funnel-like lower portion of the container, which will be referred to hereinafter as the separator. This stream of make-up monomer is contacted with the settled and settling polymer particles containing unreacted polymerization catalyst. The catalyst reacts with any contaminants such as water and other oxygenated compounds and thus removes them from the make-up monomer stream. The stream of unreacted propylene monomer carried out of the upper portion of the separator and make-up monomer may be returned, thus completing a continuous cycle. The polymer particles may be efficiently separated into at least two different sizes by providing separate discharge lines for removing the smaller particles from the upper part of the bed of polypropylene in the funnel-like lower portion of the separator and larger particles from the lower part of the bed. Baffles may be installed within the separator to facilitate separation of solids.

A further understanding of my invention may be had from an examination of the drawing which forms a part of this specification.

Referring now to the drawing, propylene polymer solids separator 10 is made up of a substantially cylindrical section 12 capped by a dished top head 14 and provided with a funnel-like lower portion 16, which is separated into upper conical shaped section 18 and lower cylindrical shaped neck 20. Propylene polymer solids settle to the bottom of the vessel 10 to form a bed of polymer 22. Freshly formed polypropylene together with unreacted monomer is introduced at the top head 14 portion of the separator 10 through vertical line 24. In an alternate embodiment line 24 may enter the top portion of separator 10 tangentially. Removal of gaseous monomer and make-up monomer takes place via line 26 which leaves the top of the separator 10 at top head 14. Make-up propylene monomer is introduced to the separator 10 via conduit 28 at the cylindrical neck 20 of lower funnel-like portion 16. Small polymer particles are discharged from the solids separator 10 through line 30 near the top of the conical portion 18 of the funnel-like section 16. Large particles of polymer are removed via line 32, which exits from the lower or cylindrical portion 20 of the funnel-like section 18 of the solids separator 10.

The following example is illustrative of my invention.

A solids separator was operated for a period of several months as follows:

The vessel used was 36 in. in diameter and 3 ft. high on the straight wall. The cone portion tapered down to a diameter of 8 in. at the base of a slope of 60°. 50 lb./hr. of polymer and 60 lb./hr. of gaseous propylene entered the solids separator from a polymerization reactor. Gaseous make-up propylene was fed to the base of the separator at the rate of 50 lb./hr. The temperature of the bed of polypropylene particles which settled in the bottom of the separator was maintained at about 20° C. The stream of make-up monomer introduced at the bottom contained approximately 2 p.p.m. $H_2O$ as it entered the base of the fluidized bed and less than 1 p.p.m. $H_2O$ as it left the top of the bed. After a week of operation 5 lb. of large polymer particles ½ in. in diameter were removed from the base of the fluidized bed. The additional polymer product of somewhat smaller particles was removed from a line at the upper part of the lower portion of the bed.

From the foregoing description and example it is thought apparent that I have provided a novel process and apparatus for a simplified one-step separation of particles of propylene polymer from gaseous propylene monomer and at the same time utilized the active catalyst still on the polymer particles to remove contaminants from the make-up monomer stream.

The invention has been described in detail with particular reference to preferred embodiments thereof, but it will be understood that variations and modifications can be effected within the spirit and scope of the invention as described hereinabove and as defined in the appended claims.

I claim:
1. In a process for making crystalline α-olefin polymers comprising continuously conducting one or more α-mono-olefinic monomer feed gases to a polymerization zone in the presence of a catalyst and continuously discharging from said zone unreacted monomer gas and solid particles of polymer containing active catalyst, the improvement which comprises contacting make-up feed gas with the particles of polymer prior to conducting the make-up gas to the polymerization zone.

2. The process of claim 1 wherein said contacting is performed in a separation zone for separating the unreacted monomer gas from the particles of polymer, and unreacted monomer gas is conducted together with the make-up gas to the polymerization zone.

3. The process of claim 1 wherein the make-up gas contains a contaminant, said contaminant being substantially removed by contact with active catalyst in the polymer particles.

4. The process of claim 1 wherein the polymer particles in the separation zone are agitated to classify the particles according to size and the smaller particles are continuously withdrawn from this zone.

5. The process of claim 4 wherein agitation is performed by fluidization of the polymer particles with the make-up gas.

6. A process for the separation of solid polymer particles from unreacted monomer remaining after polymerization which comprises introducing a first stream of polymer particles bearing unreacted catalyst and unreacted monomer gases, simultaneously introducing a separate make-up monomer gas stream into the separator at a point spaced apart from the entrance point of said first stream, settling and contacting the catalyst bearing polymer through and with the said separate stream, reacting the contaminants carried by the make-up monomer stream with the unreacted catalyst thereby at least partially removing said contaminants therefrom, removing and recycling a stream of unreacted monomer and make-up monomer gases, discharging the smaller polymer particles at a first exit point and removing larger polymer particles at a second exit point.

7. The process according to claim 1 wherein the monomer gases are propylene.

8. A process for the separation of solid polymer particles from unreacted monomer remaining after the polymerization of propylene which comprises introducing a stream of solid propylene polymer particles containing unreacted polymerization catalyst thereon and unreacted gaseous monomer into the upper portion of a solids separation zone, settling the solid propylene particles to the lower portion of said zone, simultaneously introducing make-up propylene monomer at the lower portion of said zone, and passing same upwardly substantially countercurrently to the settling solid polymer particles thereby contacting the make-up propylene monomer with the said unreacted catalyst, at least partially reacting any contaminants in the make-up monomer stream with the unreacted catalyst to thereby remove same from said make-up stream, removing the smaller particles of the settling polymer from the upper part of the lower portion of said separation zone, removing larger settled particles from the lower part of said lower portion of said separation zone, and removing and recycling a stream of unreacted monomer and make-up monomer gases from the upper portion of said separation zone.

References Cited

UNITED STATES PATENTS 3,197,453  7/1965  Harban.

JOSEPH L. SCHOFER, Primary Examiner

STANFORD M. LEVIN, Assistant Examiner

U.S. Cl. X.R.

260—94.9